US010313017B2

(12) United States Patent
Tanimura et al.

(10) Patent No.: US 10,313,017 B2
(45) Date of Patent: Jun. 4, 2019

(54) OPTICAL TRANSMITTER, OPTICAL RECEIVER AND OPTICAL TRANSMISSION METHOD

(71) Applicant: FUJITSU LIMITED, Kawasaki-shi, Kanagawa (JP)

(72) Inventors: Takahito Tanimura, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 15/645,050

(22) Filed: Jul. 10, 2017

(65) Prior Publication Data
US 2018/0026724 A1 Jan. 25, 2018

(30) Foreign Application Priority Data

Jul. 25, 2016 (JP) .................................. 2016-145791

(51) Int. Cl.
H04B 10/54 (2013.01)
H04B 10/61 (2013.01)
(Continued)

(52) U.S. Cl.
CPC ........... *H04B 10/54* (2013.01); *H04B 10/572* (2013.01); *H04B 10/616* (2013.01);
(Continued)

(58) Field of Classification Search
CPC .... H04B 10/54; H04B 10/572; H04B 10/616; H04J 14/0256; H04Q 11/0062; H04Q 2011/0069
(Continued)

(56) References Cited

U.S. PATENT DOCUMENTS 7,734,194 B2* 6/2010 Yonenaga .......... H04B 10/5051
398/208
9,559,486 B2* 1/2017 Roos ..................... H01S 3/1305
(Continued)

FOREIGN PATENT DOCUMENTS

JP 2011-244436 12/2011
JP 2013-051541 3/2013

OTHER PUBLICATIONS

Payman Samadi et al., "Virtual Machine Migration over Optical Circuit Switching Network in a Converged Inter/Intra Data Center Architecture", OSA Optical Fiber Communication Conference 2015, Th4G.6 (3 pages).
(Continued)

*Primary Examiner* — Amritbir K Sandhu
(74) *Attorney, Agent, or Firm* — Fujitsu Patent Center

(57) ABSTRACT

An optical transmitter includes: a light source configured to generate CW light; a drive signal generator configured to generate a drive signal; an optical modulator configured to modulate the CW light with the drive signal so as to generate a first optical signal; a combiner configured to combine the first optical signal and a second optical signal generated by using another light source; and a detector configured to detect a frequency difference between a frequency of the CW light and a center frequency of the second optical signal. The drive signal generator includes: a mapper configured to generate an electric field information signal based on input data; and a frequency controller configured to modify the electric field information signal based on the frequency difference such that the frequency of the CW light matches the center frequency of the second optical signal to generate the drive signal.

7 Claims, 12 Drawing Sheets

(51) Int. Cl.
*H04J 14/02* (2006.01)
*H04Q 11/00* (2006.01)
*H04B 10/572* (2013.01)

(52) U.S. Cl.
CPC ...... *H04J 14/0256* (2013.01); *H04Q 11/0062* (2013.01); *H04Q 2011/0069* (2013.01)

(58) Field of Classification Search
USPC .................................................. 398/79, 182
See application file for complete search history.

(56) References Cited

U.S. PATENT DOCUMENTS

| | | | | |
|---|---|---|---|---|
| 2005/0286907 A1* | 12/2005 | Masuda | ........... | H04B 10/25755 398/186 |
| 2008/0080872 A1* | 4/2008 | Tanaka | ................ | H04B 10/505 398/186 |
| 2009/0047030 A1* | 2/2009 | Hoshida | ................ | H04B 10/60 398/205 |
| 2011/0229148 A1* | 9/2011 | Nishihara | .......... | H04B 10/5053 398/183 |
| 2012/0177383 A1* | 7/2012 | Tanimura | ............... | H04B 10/61 398/158 |
| 2013/0051803 A1* | 2/2013 | Kato | ....................... | H04J 14/02 398/79 |
| 2014/0099110 A1* | 4/2014 | Oyama | ................ | H04B 10/506 398/65 |
| 2014/0140707 A1* | 5/2014 | Akiyama | ................ | H04J 14/06 398/183 |
| 2016/0099776 A1* | 4/2016 | Nakashima | ...... | H04B 10/50572 398/186 |
| 2017/0161602 A1* | 6/2017 | Tanimura | ................ | G06N 3/04 |
| 2018/0026724 A1* | 1/2018 | Tanimura | ................ | H04B 10/54 398/79 |
| 2018/0269980 A1* | 9/2018 | Koga | ....................... | G02F 1/01 |

OTHER PUBLICATIONS

Payman Samadi et al., "Experimental Demonstration of Converged Inter/Intra Data Center Network Architecture", In 17th International Conference on Transparent Optical Networks, IEEE, ICTON 2015, We.B.3.3 (4 pages).

* cited by examiner

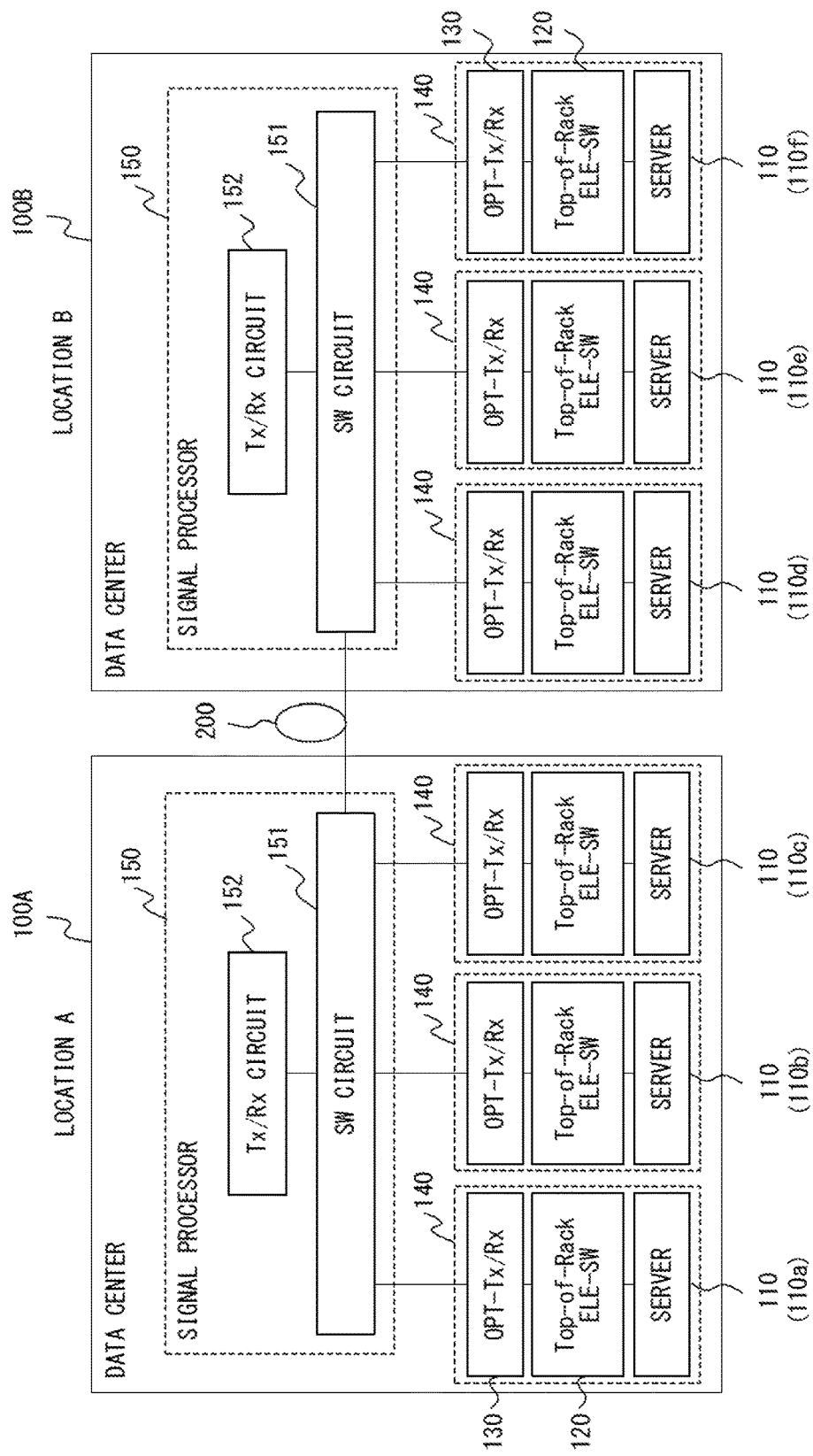
F I G. 1

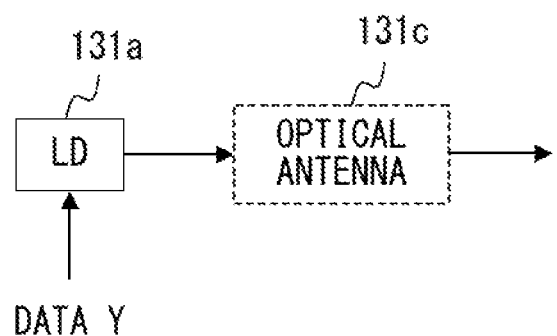
F I G. 3A
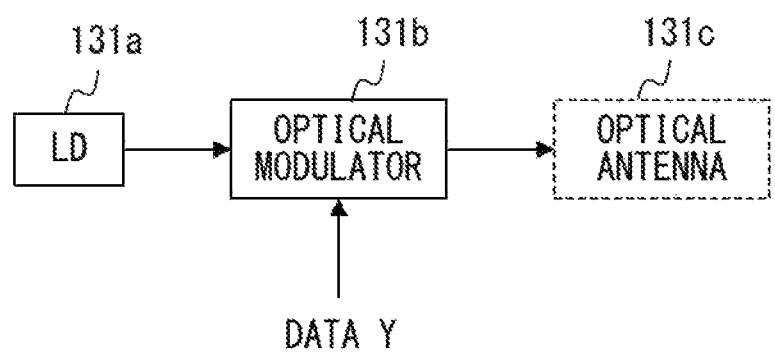
F I G. 3B

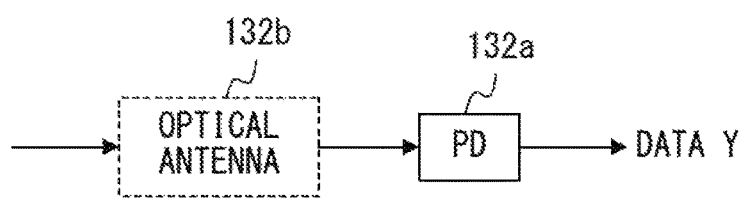
F I G. 4 A
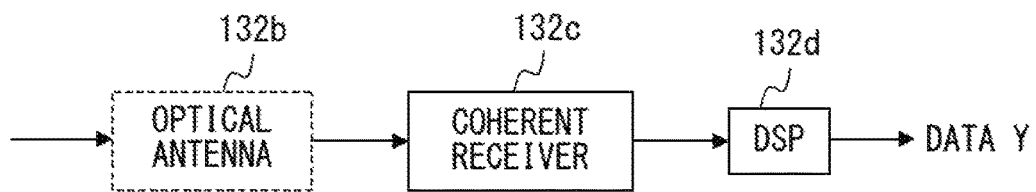
F I G. 4 B

OPTICAL TRANSMITTER, OPTICAL RECEIVER AND OPTICAL TRANSMISSION METHOD

CROSS-REFERENCE TO RELATED APPLICATION

This application is based upon and claims the benefit of priority of the prior Japanese Patent Application No. 2016-145791, filed on Jul. 25, 2016, the entire contents of which are incorporated herein by reference.

FIELD

The embodiments discussed herein are related to an optical transmitter, an optical receiver and an optical transmission method.

BACKGROUND

In recent years, there has been a need for an optical network system that is able to accommodate various applications of different communication requirements. Thus, a communication technology has been discussed that multiplexes optical signals transmitted and received using different communication schemes. For example, with respect to an application that transmits large volumes of data, a higher-order modulation scheme is used. In this case, a generation and a demodulation of a modulated optical signal are performed using a digital signal processing technology. Note that the "higher-order" indicates that the number of bits per symbol is larger, for example, two or more. On the other hand, with respect to an application that requires a low-latency data transmission (or a data transmission of a small transmission delay), a transmission technology is used that minimizes the number of "optical-electric-optical" conversions in a communication route (such as intensity modulation/direct detection (IM/DD)).

As a related technology, an optical communication system is proposed that is able to add a transmission system of a differently-modulated signal to a single optical fiber network (for example, Japanese Laid-open Patent Publication No. 2011-244436). Further, an optical multiplexer is proposed that multiplexes pieces of information densely and transmits densely-multiplexed information (for example, Japanese Laid-open Patent Publication No. 2013-51541). Furthermore, Documents 1 and 2 below respectively disclose an optical network that performs a communication in a data center and a communication between data centers.

Document 1: Payman Samadi et al., Virtual Machine Migration over Optical Circuit Switching Network in a Converged Inter/Intra Data Center Architecture, OSA Optical Fiber Communication Conference 2015, Th4G.6

Document 2: Payman Samadi et al., Experimental Demonstration of Converged Inter/Intra Data Center Network Architecture, In 17th International Conference on Transparent Optical Networks, IEEE, We.B.3.3

As described above, when data volume is large, an optical signal is generated by a higher-order modulation scheme in order to transmit data efficiently. In general, a transmittable distance is short when a data transmission is performed by a higher-order modulation scheme, so a large number of relay devices are required between a transmitter and a receiver. Further, in many cases, the data transmission performed by a higher-order modulation scheme is realized using digital signal processing whose processing delay is large. Thus, it is difficult to lower a latency of a data transmission performed by a higher-order modulation scheme. Specifically, a latency becomes larger in the configuration in which an intensity modulated optical signal is converted into an electric signal and a modulated optical signal is generated from the electric signal in a higher-order modulation scheme using digital signal processing.

For example, an intensity modulation/direct detection (IM/DD) is used in order to realize a low-latency data transmission. In this case, a latency is low because an optical signal generated by intensity modulation is transmitted up to a destination without any conversion. However, the number of bits transmitted in one symbol is small, which results in reducing the communication resource utilization efficiency.

SUMMARY

According to an aspect of the present invention, an optical transmitter includes: a light source configured to generate continuous wave light; a drive signal generator configured to generate a drive signal based on input data; an optical modulator configured to modulate the continuous wave light with the drive signal so as to generate a first optical signal; a combiner configured to combine the first optical signal and a second optical signal generated by using another light source that is different from the light source; and a frequency difference detector configured to detect a frequency difference between a frequency of the continuous wave light and a center frequency of the second optical signal. The drive signal generator includes: a mapper configured to generate an electric field information signal based on the input data; and a frequency controller configured to modify the electric field information signal based on the frequency difference such that the frequency of the continuous wave light matches the center frequency of the second optical signal so as to generate the drive signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical network system;

FIGS. 3A and 3B illustrate examples of an optical transmission circuit;

FIGS. 4A and 4B illustrate examples of an optical reception circuit;

DESCRIPTION OF EMBODIMENTS

Figure 2:
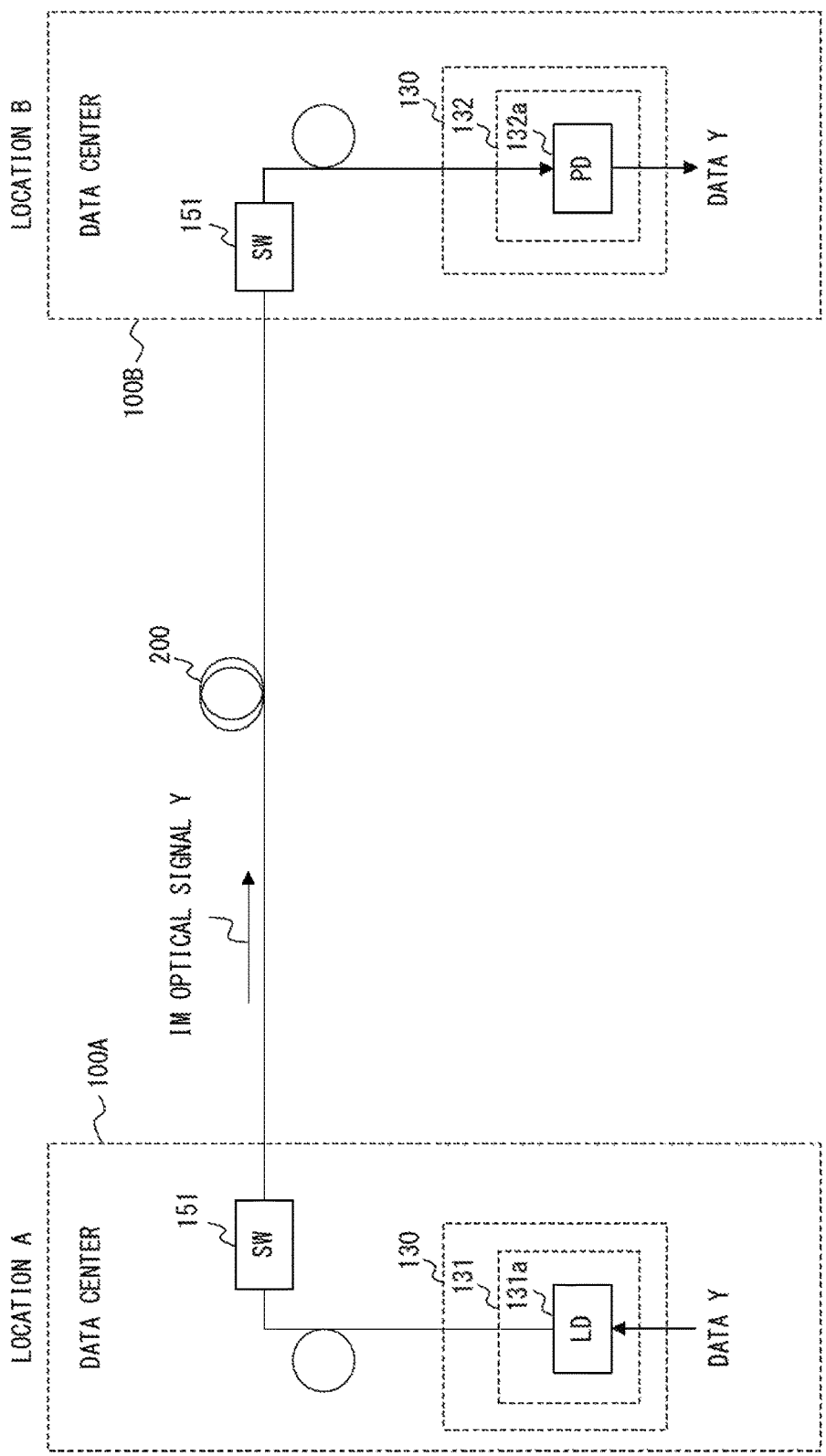
FIG. 2 illustrates an example of a communication using an express path.

FIG. 1 illustrates an example of an optical network system according to embodiments of the present invention. In the example illustrated in FIG. 1, data centers 100 (100A, 100B) arranged in different locations are connected through an optical fiber link 200.

Each of the data centers accommodates a plurality of servers 110. In the example illustrated in FIG. 1, the data center 100A accommodates servers 110a to 110c. The data center 100B accommodates servers 110d to 110f. Each of the servers 110a to 110f is configured to include a plurality of server elements.

A user can access a desired server 110. In this case, data may be transmitted between servers in response to this access. For example, a data communication may be performed between servers that are accommodated in one data center. Alternatively, a data communication may be performed between data centers. For example, it is assumed that the server 110d stores backup data for the server 110a. In this case, when data stored in the server 110a is updated, a communication is performed between the servers 110a and 110d, and the data in the server 110d is also updated. Alternatively, the user can move data stored in a certain server to another server.

As described above, an optical network system transmits data between servers in response to a request from a user. However, desired communication requirements differ by application. For example, a communication that is able to transmit large volumes of data efficiently may be requested. Further, a low-latency communication may also be requested. Thus, an optical network system is desired to satisfy various communication requirements.

Each server 110 is accommodated in a server rack 140. The server rack 140 accommodates a top-of-rack electric switch 120 and an optical transceiver 130 in addition to the server 110. The top-of-rack electric switch 120 has a function that aggregates signals transmitted from a plurality of server elements and a function that distributes received signals to the plurality of server elements. The optical transceiver 130 generates an optical signal from an output signal of the top-of-rack electric switch 120 and guides the optical signal to a signal processor 150. In addition, the optical transceiver 130 converts the optical signal received from the signal processor 150 into an electric signal and guides the electric signal to the top-of-rack electric switch 120.

The signal processor 150 includes a switch circuit 151 and a transceiver circuit 152. The switch circuit 151 provides an optical path according to the communication requested by a user. For example, when a request to move data stored in the server 110a to the server 110b is provided, the switch circuit 151 guides an optical signal transmitted from a server rack that accommodates the server 110a to a server rack that accommodates the server 110b. When a request to move data stored in the server 110a to the server 110d is provided, the switch circuit 151 guides an optical signal transmitted from the server rack that accommodates the server 110a to the data center 100B.

The transceiver circuit 152 processes a modulated optical signal that is transmitted between the data centers 100A and 100B. The transceiver circuit 152 includes an optical transmitter that transmits a modulated optical signal and an optical receiver that receives a modulated optical signal. In this example, the modulated optical signal is generated by a higher-order modulation scheme (that is, a modulation scheme that transmits two or more bits of data for each symbol).

As an example, when a request to move data stored in the server 110a to the server 110d is provided, the transceiver circuit 152 of the data center 100A converts an optical signal transmitted from the server rack that accommodates the server 110a into an electric signal. The transceiver circuit 152 generates a modulated optical signal from this electric signal by digital signal processing and transmits the generated modulated optical signal to the data center 100B. Then, in the data center 100B, the transceiver circuit 152 demodulates the received modulated optical signal so as to recover data. Further, the transceiver circuit 152 generates an optical signal that transmits the recovered data and guides the optical signal to the server rack that accommodates the server 110d.

In the optical network system illustrated in FIG. 1, communication resources of an optical fiber link 200 are desired to be used efficiently. Thus, a communication between the data centers 100A and 100B is realized using the transceiver circuit 152. In other words, an optical signal generated by a higher-order modulation scheme is transmitted between the data centers 100A and 100B.

However, a communication that uses the transceiver circuit 152 includes converting an optical signal output from the optical transceiver 130 into an electric signal, generating a drive signal from the electric signal by digital signal processing, demodulating a modulated optical signal by coherent detection, and converting data obtained by the demodulation into an optical signal to transmit the optical signal to the optical transceiver 130. Thus, it is difficult to perform a low-latency communication. Therefore, when a request to perform a low-latency communication is made between the data centers 100A and 100B, the optical network system transmits an optical signal between the optical transceivers 130 and 130 through the switch circuit 151 without using the transceiver circuit 152.

In the following descriptions, an optical path that transmits a modulated optical signal between the data centers 100A and 100B using the transceiver circuit 152 may be referred to as a "general communication path". Further, an optical path that transmits an optical signal between the data centers 100A and 100B without using the transceiver circuit 152 may be referred to as an "express path".

FIG. 2 illustrates an example of a communication using an express path. In the example illustrated in FIG. 2, it is assumed that data is transmitted from the data center 100A arranged at a location A to the data center 100B arranged at a location B. The express path is realized by, for example, intensity modulation (IM)/direct detection (DD).

Each optical transceiver 130 includes an optical transmission circuit 131 and an optical reception circuit 132. As illustrated in FIG. 1, the optical transceiver 130 is provided in each server rack 140. In FIG. 2, the optical reception circuit 132 implemented in the optical transceiver 130 of the data center 100A is omitted, and the optical transmission circuit 131 implemented in the optical transceiver 130 of the data center 100B is omitted.

In the data center 100A, data Y is provided to the optical transmission circuit 131. The data Y is output from the server 110 accommodated in the server rack 140. The optical transmission circuit 131 includes a light source (LD) 131a.

Then, the optical transmission circuit 131 generates an optical signal that transmits the data Y using the light source 131a. In this example, the optical transmission circuit 131 generates an intensity modulated optical signal (optical signal Y) from the data Y by intensity modulation (or on/off keying). In this case, for example, the light source 131a is driven by direct modulation. Here, the light source 131a may be a frequency tunable laser light source. In the following descriptions, the intensity modulated optical signal may be referred to as an "IM optical signal".

An IM optical signal Y generated by the optical transmission circuit 131 is transmitted to the data center 100B by the switch circuit 151. In the data center 100B, the switch circuit 151 guides the received IM optical signal Y to the optical reception circuit 132. The optical reception circuit 132 includes a photo detector (PD) 132a. The optical reception circuit 132 converts the IM optical signal Y into an electric signal using the photo detector 132a. Here, the power or the amplitude of an output signal of the photo detector 132a represents a value of each bit of the data Y. Thus, the data Y is recovered by converting the IM optical signal Y into an electric signal.

FIGS. 3A and 3B illustrate examples of an optical transmission circuit that generates an IM optical signal. As illustrated in FIG. 3A, the optical transmission circuit 131 includes the light source 131a. The light source 131a is, for example, a frequency tunable laser light source. In this configuration, an IM optical signal is generated by direct modulation. In other words, the light source 131a is driven by input data. An IM optical signal output from the light source 131a may be guided to a specified optical port by performing spatial transmission using an optical antenna 131c. The optical antenna 131c is, for example, implemented by an optical system that includes a mirror and a lens.

As illustrated in FIG. 3B, the optical transmission circuit 131 may be configured to include the light source 131a and an optical modulator 131b. In this case, the light source 131a generates continuous wave light. The optical modulator 131b modulates the continuous wave light with input data so as to generate an IM optical signal. The optical modulator 131b generates an IM optical signal from input data by, for example, intensity modulation (on/off keying).

As described above, the optical transmission circuit 131 generates an IM optical signal according to input data. However, the embodiments of the present invention are not limited to this configuration. For example, when the optical transmission circuit 131 is realized by the configuration of FIG. 3B, the optical modulator 131b may generate a modulated optical signal by phase shift keying (mPSK) or quadrature amplitude modulation (mQAM).

FIGS. 4A and 4B illustrate examples of the optical reception circuit 132. The optical reception circuit 132 receives an optical signal transmitted from the optical transmission circuit 131 of FIG. 3A or 3B. As illustrated in FIG. 4A, the optical reception circuit 132 includes the photo detector (PD) 132a. When the received optical signal is an intensity modulated signal, data is recovered by converting the received optical signal into an electric signal using a photo detector. An optical signal that arrives at an input optical port may be guided to the photo detector 132a using an optical antenna 132b.

As illustrated in FIG. 4B, the optical reception circuit 132 may be configured to include a coherent receiver 132c and a digital signal processor (DSP) 132d. It is preferable that the optical reception circuit 132 be configured to recover data Y by performing coherent detection when a modulated optical signal is generated by phase shift keying or quadrature amplitude modulation.

Figure 5:
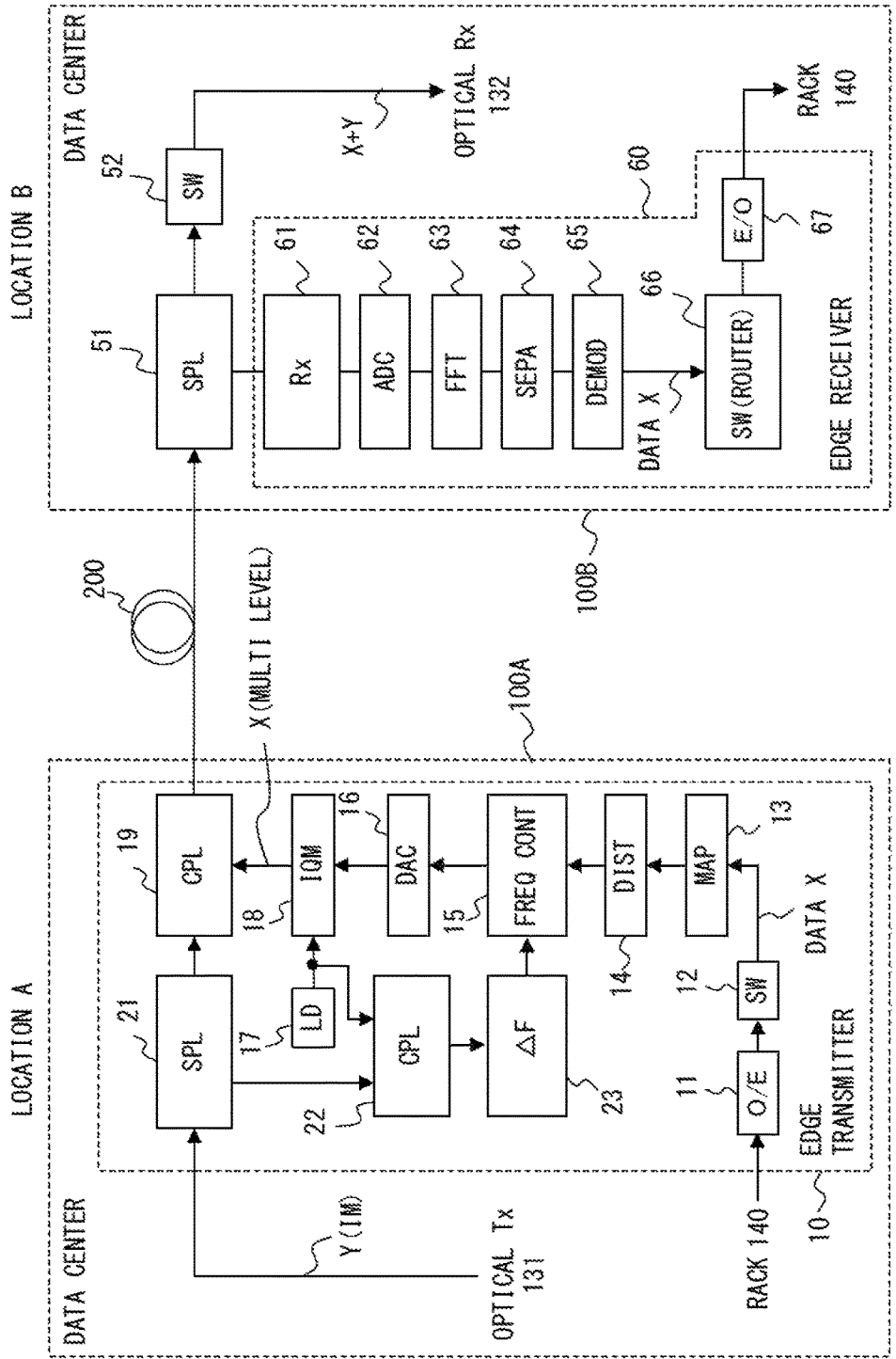
FIG. 5 illustrates an example of a communication using a general communication path.

FIG. 5 illustrates an example of a communication using a general communication path. The general communication path is established by the transceiver circuit 152 illustrated in FIG. 1. The transceiver circuit 152 includes an edge transmitter 10 and an edge receiver 60. In FIG. 5, the edge receiver 60 of the data center 100A is omitted, and the edge transmitter 10 of the data center 100B is omitted.

The edge transmitter 10 includes an O/E circuit 11, an optical switch (SW) 12, a mapper (MAP) 13, a distortion corrector (DIST) 14, a frequency controller (FREQ CONT) 15, a D/A converter (DAC) 16, a light source (LD) 17, and an IQ modulator (IQM) 18. The mapper 13, the distortion corrector 14, and the frequency controller 15 are implemented by, for example, a digital signal processor. In this case, the mapper 13, the distortion corrector 14, and the frequency controller 15 may be implemented by one processor or by two or more processors. Alternately, the mapper 13, the distortion corrector 14, and the frequency controller 15 mat be implemented by a digital signal processing circuit.

The O/E circuit 11 converts an optical signal transmitted from the server rack 140 in the data center 100A into an electric signal. When an intensity modulated optical signal is transmitted from the server rack 140, the O/E circuit 11 is implemented by a photo detector. The optical switch 12 guides the electric signal output from the O/E circuit 11 to the mapper 13. The optical switch 12 may have an aggregation function. In other words, the optical switch 12 may aggregate a plurality of electric signals and guide the aggregated signal to the mapper 13. In the following descriptions, data provided to the mapper 13 may be referred to as "data X".

The mapper 13 generates an electric field information signal from the data X according to a specified modulation scheme. The electric field information signal indicates a phase and an amplitude of a modulated optical signal output from the IQ modulator 18. Thus, this electric field information signal is configured by an I-component signal and a Q-component signal. The distortion corrector 14 corrects the electric field information signal generated by the mapper 13 such that a chromatic dispersion of the optical fiber link 200 is compensated for. In other words, the distortion corrector 14 performs pre-equalization or pre-compensation in order to compensate for a chromatic dispersion of the optical fiber link 200.

The frequency controller 15 is started when a general communication path and an express path are multiplexed in a wavelength channel. The frequency controller 15 will be described later.

The D/A converter 16 converts the electric field information signal into an analog signal so as to generate a drive signal. In other words, a drive signal is generated by the mapper 13, the distortion corrector 14, the frequency controller 15, and the converter 16. That is, the mapper 13, the distortion corrector 14, the frequency controller 15, and the converter 16 operate as a drive signal generator that generates a drive signal. Alight source 17 is implemented by a frequency tunable laser light source in this example. In other words, the light source 17 outputs continuous wave light of a specified frequency. The IQ modulator 18 modulates the continuous wave light output from the light source 17 with a drive signal, so as to generate a modulated optical signal. The modulated optical signal generated by the IQ modulator 18 is transmitted to the data center 100B through the optical fiber link 200.

Note that the mapper 13 generates an electric field information signal from data X according to a modulation scheme that transmits two or more bits of data for each symbol. In other words, a modulated optical signal output from the IQ modulator 18 transmits two or more bits of data for each symbol. Therefore, in the following descriptions, the modulated optical signal output from the IQ modulator 18 may be referred to as a "multi-level optical signal".

Figure 6A:
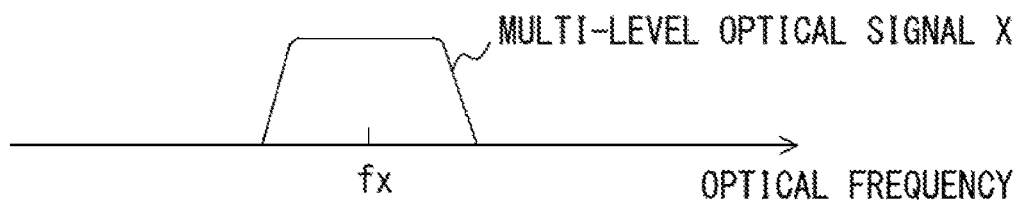
FIGS. 6A-6E schematically illustrate optical spectra of a communication between data centers.

FIG. 6A illustrates a spectrum of a multi-level optical signal X generated by the edge transmitter 10. An optical frequency fx corresponds to a frequency of continuous wave light output from the light source 17. In other words, the optical frequency fx represents a center frequency of the multi-level optical signal X. The width of the spectrum (that is, the bandwidth of a modulated optical signal) depends on a baud rate and a modulation scheme of the multi-level optical signal X.

It is assumed that a request to perform a low-latency data transmission is made when the general communication path described above is established. In other words, it is assumed that an IM optical signal Y is transmitted from the optical transmission circuit 131 of FIG. 2 when the multi-level optical signal X generated by the edge transmitter 10 is being transmitted.

In this case, in order to save the communication resources of the optical fiber link 200, a general communication path that transmits a multi-level optical signal X and an express path that transmits an IM optical signal Y are multiplexed in one wavelength channel. In the configuration illustrated in FIG. 5, the multi-level optical signal X and the IM optical signal Y are combined by an optical coupler 19 and guided to the optical fiber link 200.

Figure 6B:
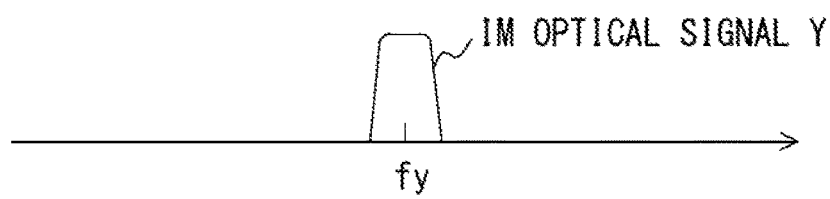

FIG. 6B illustrates a spectrum of an IM optical signal Y generated by the optical transmission circuit 131. An optical frequency fy corresponds to a center frequency of an output optical signal of the light source 131a illustrated in FIG. 2, 3A, or 3B. In other words, the optical frequency fy represents a center frequency of the IM optical signal Y. The width of the spectrum (that is, the bandwidth of a modulated optical signal) depends on, for example, a baud rate of the IM optical signal Y.

Here, in order to multiplex a general communication path and an express path in one wavelength channel, the center optical frequency fx of the multi-level optical signal X and the center optical frequency fy of the IM optical signal Y need to match each other. Thus, for example, the optical frequency of the output light of the light source 17 is controlled such that fx and fy match each other. However, an oscillating frequency of a laser has an error. A maximum frequency error of a general laser light source is about 1.5 GHz. Thus, fx and fy rarely completely match each other. For example, in the examples illustrated in FIGS. 6A and 6B, the center optical frequency fy of the IM optical signal Y is slightly higher than the center optical frequency fx of the multi-level optical signal X.

Thus, the edge transmitter 10 has a function to match the optical frequency fx and the optical frequency fy. In other words, the edge transmitter 10 includes an optical splitter (SPL) 21, an optical coupler (CPL) 22, and a frequency difference detector (ΔF) 23 in addition to the circuit components described above.

The optical splitter 21 splits an IM optical signal Y transmitted from the optical transmission circuit 131 of the server rack 140 and guides the IM optical signal Y to the optical coupler 22. The optical coupler 22 combines continuous wave light output from the light source 17 and the IM optical signal Y guided from the optical splitter 21. The frequency difference detector 23 includes a photo detector that converts output light of the optical coupler 22 into an electric signal. Then, according to the electric signal output from this photo detector, the frequency difference detector 23 detects a frequency of a beat component of an output light of the optical coupler 22. The frequency of the beat component of the output light of the optical coupler 22 indicates a difference between the center optical frequency fx of the multi-level optical signal X and the center optical frequency fy of the IM optical signal Y. Note that the frequency difference detector 23 may detect the frequency of a beat component by digital signal processing. In this case, the frequency difference detector 23 may include an FFT circuit.

Figure 7:
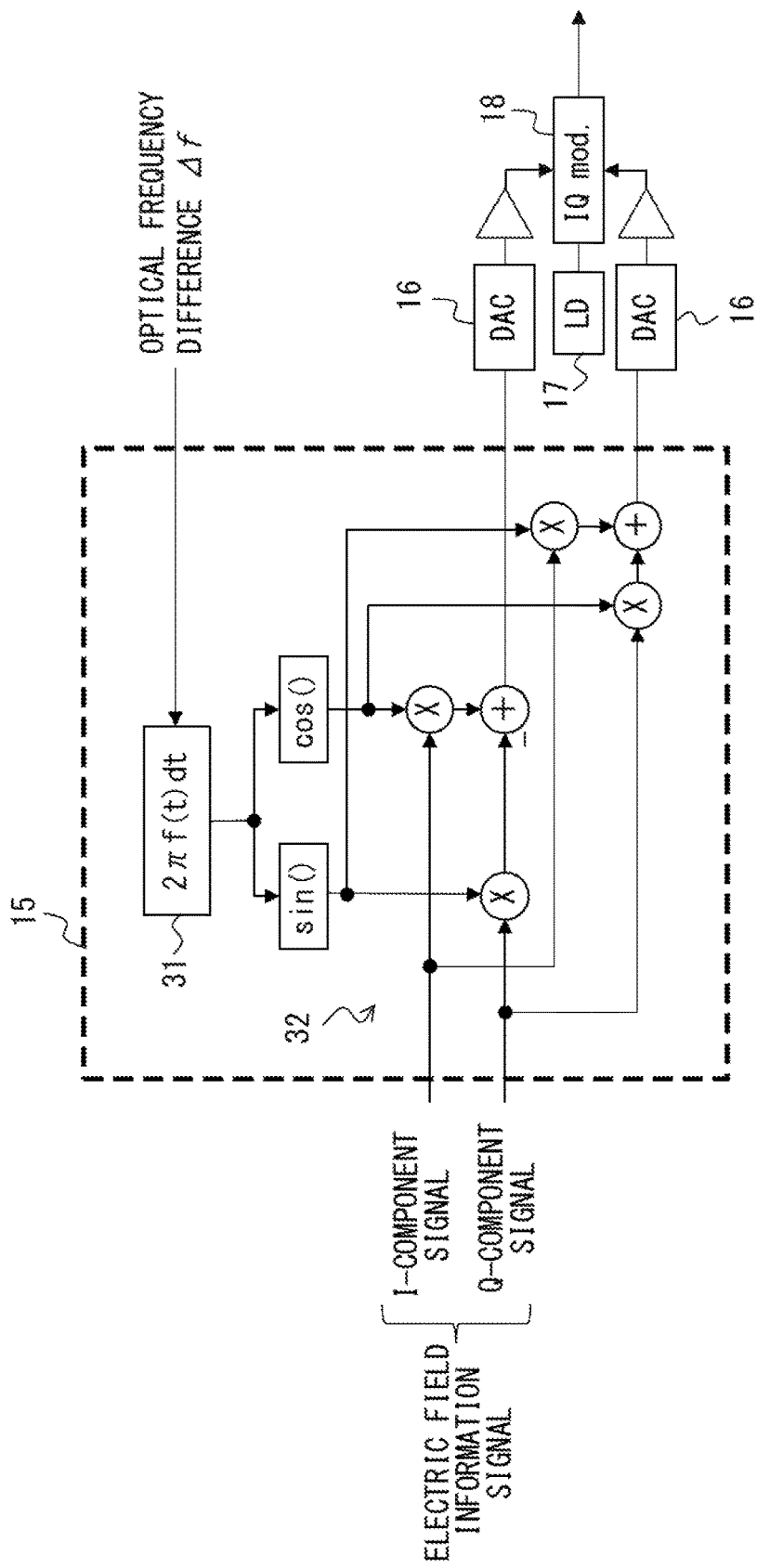
FIG. 7 illustrates an example of a frequency controller.

The frequency controller 15 modifies an electric field information signal according to a frequency difference detected by the frequency difference detector 23. FIG. 7 illustrates an example of the frequency controller 15. In the example of FIG. 7, the frequency controller 15 is implemented by a digital signal processor.

The frequency controller 15 includes an integrator circuit 31 and a rotation operation circuit 32. A function f(t) and an electric field information signal are provided to the frequency controller 15. The function f(t) is an optical frequency difference Δf detected by the frequency difference detector 23. The electric field information signal is generated by the mapper 13 and configured by an I-component signal and a Q-component signal.

The integrator circuit 31 integrates an optical frequency difference Δf over time. Then, the integrator circuit 31 outputs the following phase information θ(t) as an integration result.

$$\theta(t)=\int 2\pi f(t)dt$$

The integrator circuit 31 may include a mod2π circuit. In this case, an output value of the integrator circuit 31 is converted into a value included between 0 and 2π.

The rotation operation circuit 32 modifies the I-component signal and the Q-component signal using the following calculations by use of the phase information θ(t). In other words, the rotation operation circuit 32 controls a phase indicated by the I-component signal and the Q-component signal according to the optical frequency difference Δf detected by the frequency difference detector 23. I and Q respectively represent input signals of the rotation operation circuit 32. I' and Q' respectively represent output signals of the rotation operation circuit 32.

$$I'=I\cdot\cos\theta(t)-Q\cdot\sin\theta(t)$$

$$Q'=I\cdot\sin\theta(t)+Q\cdot\cos\theta(t)$$

An output signal of the frequency controller 15 is converted into an analog signal by the D/A converter 16 and provided to the IQ modulator 18. Then, the IQ modulator 18 modulates the continuous wave light output from the light source 17 with the output signal of the operation circuit 32, so as to generate the multi-level optical signal X.

As described above, the electric field information signal is modified according to the optical frequency difference Δf. Thus, the center frequency of the multi-level optical signal X generated by the IQ modulator 18 is fx+Δf. fx represents a frequency of the continuous wave light output from the light source 17. Here, the optical frequency difference Δf corresponds to a difference between the frequency fx of the continuous wave light output from the light source 17 and the center optical frequency fy of the IM optical signal Y. Thus, when the electric field information signal is modified by the frequency controller 15, the center frequency of the multi-level optical signal X generated by the IQ modulator 18 matches the center optical frequency fy of the IM optical signal Y, as illustrated in FIG. 6C.

Figure 6C:
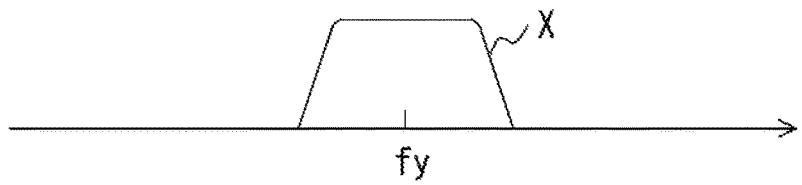

However, the signal band of the IM optical signal Y illustrated in FIG. 6B and the signal band of the multi-level optical signal X illustrated in FIG. 6C overlap in the frequency domain. Thus, if the IM optical signal Y and the multi-level optical signal X are multiplexed in frequency domain, it will be difficult for an optical receiver to separate these optical signals. Thus, when an express path is established in addition to a general communication path, the edge transmitter 10 generates an electric field information signal of a modulated optical signal transmitted through the general communication path such that the signal band of the express path and the signal band of the general communication path do not overlap.

Figure 8:
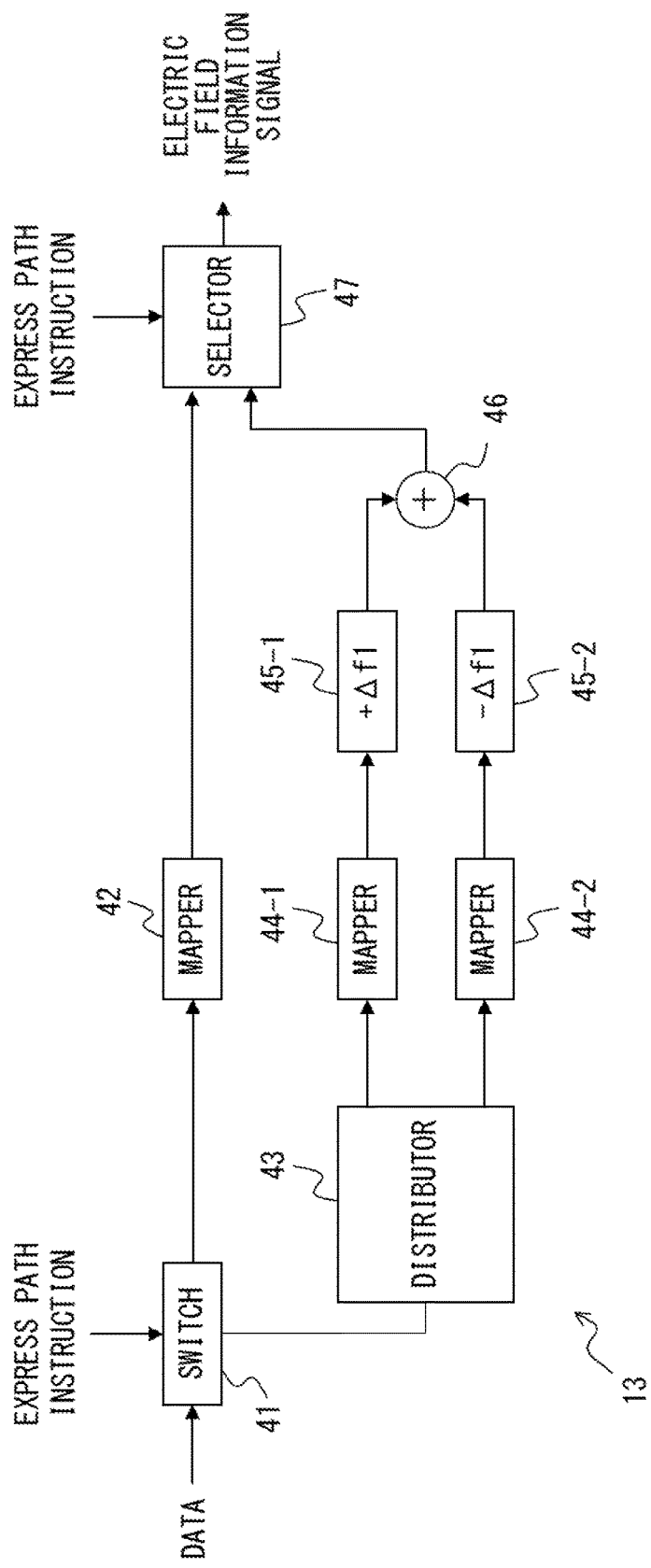
FIG. 8 illustrates an example of a mapper.

FIG. 8 illustrates an example of the mapper 13. In this example, the mapper 13 includes a switch 41, a mapper 42, a distributor 43, mappers 44-1 and 44-2, frequency controllers 45-1 and 45-2, an adder 46, and a selector 47. An express path instruction that indicates whether to establish an express path is provided to the mapper 13.

When an instruction to establish an express path is not provided, the switch 41 guides input data to the mapper 42. On the other hand, when the instruction to establish an express path is provided, the switch 41 guides the input data to the distributor 43. The distributor 43 distributes the input data to the mappers 44-1 and 44-2. Here, for example, the distributor 43 alternately distributes the input data to the mappers 44-1 and 44-2 for each N bits. N corresponds to a modulation scheme.

The mapper 42 generates an electric field information signal from the input data according to a specified modulation scheme. Each of the mappers 44-1 and 44-2 generates an electric filed information signal from the input data by a modulation scheme that is to be determined according to a modulation scheme of the mapper 42. When the mapper 42 performs mapping according to a modulation scheme of 2 k bits/symbol, each of the mappers 44-1 and 44-2 performs mapping according to a modulation scheme of k bits/symbol. For example, when k is 2 and the mapper 42 performs mapping by 16 QAM, each of the mappers 44-1 and 44-2 performs mapping by QPSK. In this case, the distributor 43 alternately distributes the input data to the mappers 44-1 and 44-2 for each 2 bits. When k is 4 and the mapper 42 performs mapping by 256 QAM, each of the mappers 44-1 and 44-2 performs mapping by 16 QAM. In this case, the distributor 43 alternately distributes the input data to the mappers 44-1 and 44-2 for each 4 bits.

The frequency controller 45-1 modifies an output signal of the mapper 44-1 such that a center frequency of a modulated optical signal generated according to the output signal of the mapper 44-1 is higher by $\Delta f1$. On the other hand, the frequency controller 45-2 modifies an output signal of the mapper 44-2 such that a center frequency of a modulated optical signal generated according to the output signal of the mapper 44-2 is lower by $\Delta f1$. The configurations and the operations of the frequency controllers 45-1 and 45-2 are substantially the same as the configuration and the operation of the frequency controller 15 illustrated in FIG. 7. However, $+\Delta f1$ and $-\Delta f1$ are respectively provided to the frequency controllers 45-1 and 45-2 as a function f(t). $\Delta f1$ is determined such that a spectrum of the multi-level optical signal X and a spectrum of the IM optical signal Y do not overlap when the center optical frequency of the multi-level optical signal X and the center optical frequency of the IM optical signal Y match each other. $\Delta f1$ is, for example, about 5 GHz.

The adder 46 combines an output signal of the frequency controller 45-1 and an output signal of the frequency controller 45-2. The selector 47 selects an output signal of the mapper 42 when an instruction to establish an express path is not provided. On the other hand, the selector 47 selects an output signal of the adder 46 when the instruction to establish an express path is provided. Then, the mapper 13 outputs the signal selected by the selector 47 as an electric field information signal.

Figure 6D:
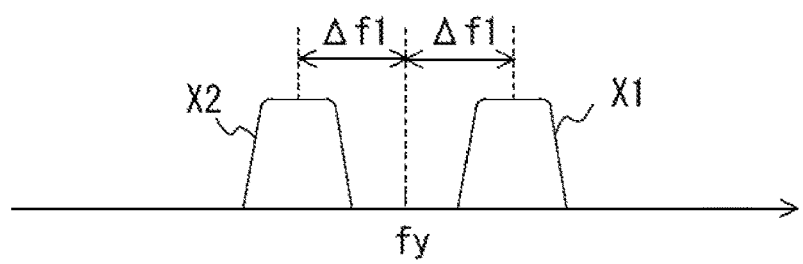

FIG. 6D illustrates a spectrum of a multi-level optical signal X generated by the IQ modulator 18 when an express path is established. X1 represents an optical signal generated according to the electric field information signal output from the mapper 44-1, and X2 represents an optical signal generated according to the electric field information signal output from the mapper 44-2. The center frequency of X1 is fy+$\Delta f1$, and the center frequency of X2 is fy-$\Delta f1$.

Figure 6E:
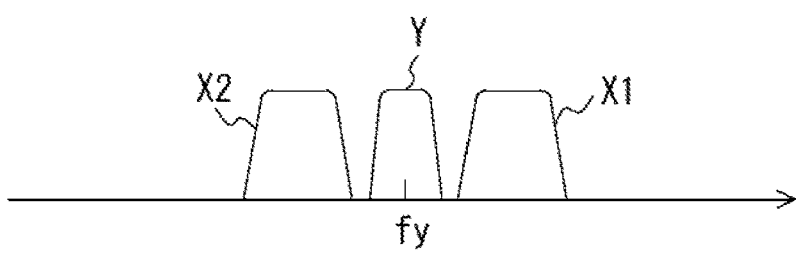

FIG. 6E illustrates a spectrum of an output optical signal of the edge transmitter 10 when a general communication path and an express path are multiplexed. As illustrated in FIG. 6E, even if the general communication path and the express path are multiplexed, the signal band of the express path and the signal band of the general communication path do not overlap. In other words, the amount of frequency shift $\Delta f1$ is determined such that the signal band of the express path and the signal band of the general communication path do not overlap. Here, the signal bandwidth of a modulated optical signal is estimated according to a baud rate and a modulation scheme of the modulated optical signal. Thus, the mapper 13 can generate an electric field information signal from input data such that the signal band of the express path and the signal band of the general communication path do not overlap.

As described above, when an express path is not established, the edge transmitter 10 of the data center 100A transmits the multi-level optical signal X illustrated in FIG. 6A to the data center 100B. On the other hand, when the express path is established, the edge transmitter 10 transmits a multi-level optical signal X (X1, X2) and a IM optical signal Y to the data center 100B, as illustrated in FIG. 6E.

An optical signal transmitted from the data center 100A through the optical fiber link 200 is split by an optical splitter 51 in the data center 100B, and the optical signal is guided to an optical switch 52 and an edge receiver 60. The optical switch 52 guides the received optical signal to an optical reception circuit 132 of a server rack that accommodates a destination server.

For example, the optical reception circuit 132 converts the received optical signal into an electric signal using the photo detector 132a, as illustrated in FIG. 2. Here, it is assumed that an express path is established in addition to a general communication path. That is to say, the optical reception circuit 132 receives the multi-level optical signal X (X1, X2) generated by the IQ modulator 18 and the IM optical signal Y transmitted from the optical transmission circuit 131, as illustrated in FIG. 6E. In this case, the IM optical signal Y is substantially a baseband signal in the electric domain. Thus, when the IM optical signal Y is converted into an electric signal by the photo detector 132a, data Y is recovered. On the other hand, the center frequency of the multi-level optical signal (X1, X2) is shifted by $\Delta f1$ with respect to the baseband in the electric domain. Thus, if the bandwidth of the photo detector 132a is lower than $\Delta f1$, a signal component of the multi-level optical signal X will not be detected by the photo detector 132a. In other words, if the bandwidth of the photo detector 132a included in the optical reception circuit 132 is configured to be lower than $\Delta f1$, the optical reception circuit 132 can recover the data Y transmitted by the IM optical signal Y from the optical signal illustrated in FIG. 6E. In order to remove the multi-level optical signal X with a high degree of accuracy, a low-pass filter may be provided on the output side of the photo detector 132a.

As illustrated in FIG. 5, the edge receiver 60 includes a coherent receiver (Rx) 61, an A/D converter (ADC) 62, an FFT processor 63, a separator (SEPA) 64, a demodulator (DEMOD) 65, an electric switch (SW) 66, and an E/O circuit 67. The FFT processor 63, the separator 64, and the demodulator 65 are implemented by, for example, a digital signal processor. In this case, the FFT processor 63, the separator 64, and the demodulator 65 may be implemented by one processor or by two or more processors. Alternately, the FFT processor 63, the separator 64, and the demodulator 65 may be implemented by a digital signal processing circuit.

The coherent receiver 61 generates an electric field information signal that represents a received optical signal using a local light source. When the coherent receiver 61 receives the multi-level optical signal X illustrated in FIG. 6A, the frequency of the local light source is controlled at fx. Further, when the coherent receiver 61 receives the multi-level optical signal X and the IM optical signal Y illustrated in FIG. 6E, the frequency of the local light source may be controlled at fy. The A/D converter 62 converts the electric field information signal generated by the coherent receiver 61 into a digital signal. The FFT processor 63 converts an output signal of the A/D converter 62 into a frequency-domain signal.

Figure 9:
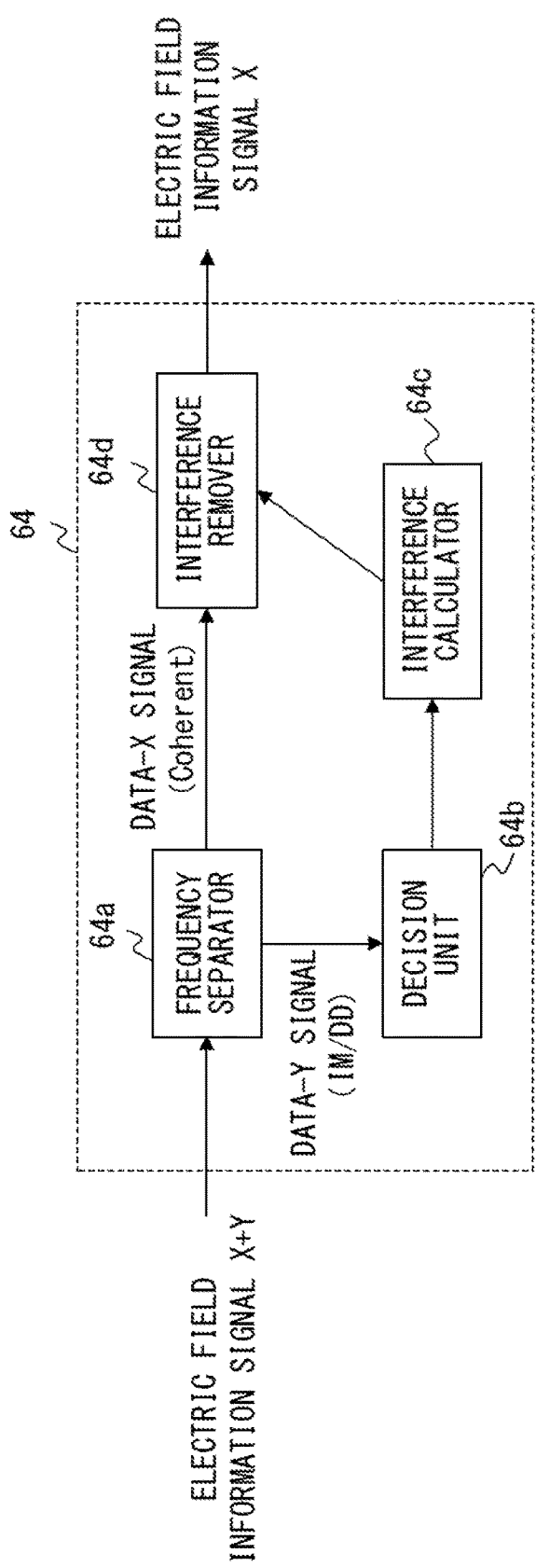
FIG. 9 illustrates an example of a separator.

As illustrated in FIG. 9, the separator 64 includes a frequency separator 64a, a decision unit 64b, an interference calculator 64c, an interference remover 64d. The separator 64 receives an input signal that includes a signal component transmitted by the multi-level optical signal X (data-X signal component) and a signal component transmitted by the IM optical signal Y (data-Y signal component) and extracts the data-X signal component from the input signal.

The frequency separator 64a extracts the data-X signal component and the data-Y signal component from the frequency-domain signal output from the FFT processor 63. The data-X signal component is guided to the interference remover 64d, and the data-Y signal component is guided to the decision unit 64b. The decision unit 64b decides a value for each symbol according to the data-Y signal component. Here, the data Y is transmitted by the optical transmission circuit 131 illustrated in FIG. 3A or 3B by intensity modulation (or on/off keying). Thus, the decision unit 64b detects "1" or "0" for each symbol.

The interference calculator 64c calculates an interference component between the multi-level optical signal x and the IM optical signal Y. Specifically, the interference calculator 64c calculates a phase variation of the multi-level optical signal X due to the IM optical signal Y. Here, when the IM optical signal is in an OFF state, the phase variation of the multi-level optical signal X due to the IM optical signal Y is substantially zero. On the other hand, when the IM optical signal Y is in an ON state, the phase of the multi-level optical signal X varies due to the IM optical signal Y. The amount of the phase variation can be calculated according to the features and the length of the optical fiber link 200. Thus, the interference calculator 64c calculates a phase variation of the multi-level optical signal X due to the IM optical signal Y according to the ON/OFF state of the IM optical signal Y.

The interference remover 64d removes an interference component from the data-X signal component. The removal of an interference component is realized by, for example, subtraction. In other words, the separator 64 extracts an electric field information signal that represents a multi-level optical signal X and removes an interference component from the electric field information signal.

The separator 64 does not always have to remove an interference component. In this case, the separator 64 does not have to include the decision unit 64b, the interference calculator 64c, and the interference remover 64d. The separator 64 extracts and outputs an electric field information signal that represents the multi-level optical signal X. In this case, the separator 64 operates as a frequency filter.

Return to FIG. 5. The demodulator 65 demodulates each symbol according to the electric field information signal output from the separator 64. Here, the demodulator 65 performs a demapping that corresponds to a mapping performed by the mapper 13 of the data center 100A. As a result, data X is recovered. The switch 66 guides the data X to an E/O circuit 67 that corresponds to a destination server. In other words, the electric switch 66 operates as a router. The E/O circuit 67 converts the data X into an optical signal. The E/O circuit 67 is realized by, for example, the configuration illustrated in FIG. 3A or 3B. Then, the optical signal that carries the data X is transmitted to a server rack that accommodates the destination server of the data X.

As described above, a data communication between data centers is usually realized through a general communication path in order to save the communication resources of the optical fiber link 200. The general communication path transmits a modulated optical signal generated by a higher-order modulation scheme. In addition, when a low-latency data communication is performed between data centers, a general communication path and an express path are multiplexed in one wavelength channel. The express path is realized by, for example, IM/DD. Here, electric field information on the general communication path is modified by digital signal processing such that the center wavelength of the general communication path and the center wavelength of the express path match each other, and the signal band of the general communication path and the signal band of the express path do not overlap. Thus, it is possible to realize a low-latency data communication as needed while saving the communication resources between data centers.

Further, the edge receiver 60 can suppress a phase variation due to an adjacent optical signal when the edge receiver 60 extracts an electric field information signal of a target optical signal from a multiplexed optical signal. Thus, even if a general communication path and an express path are multiplexed in one wavelength channel, data transmitted through a general communication path can be recovered with a high degree of accuracy.

<Example>

Figure 10:
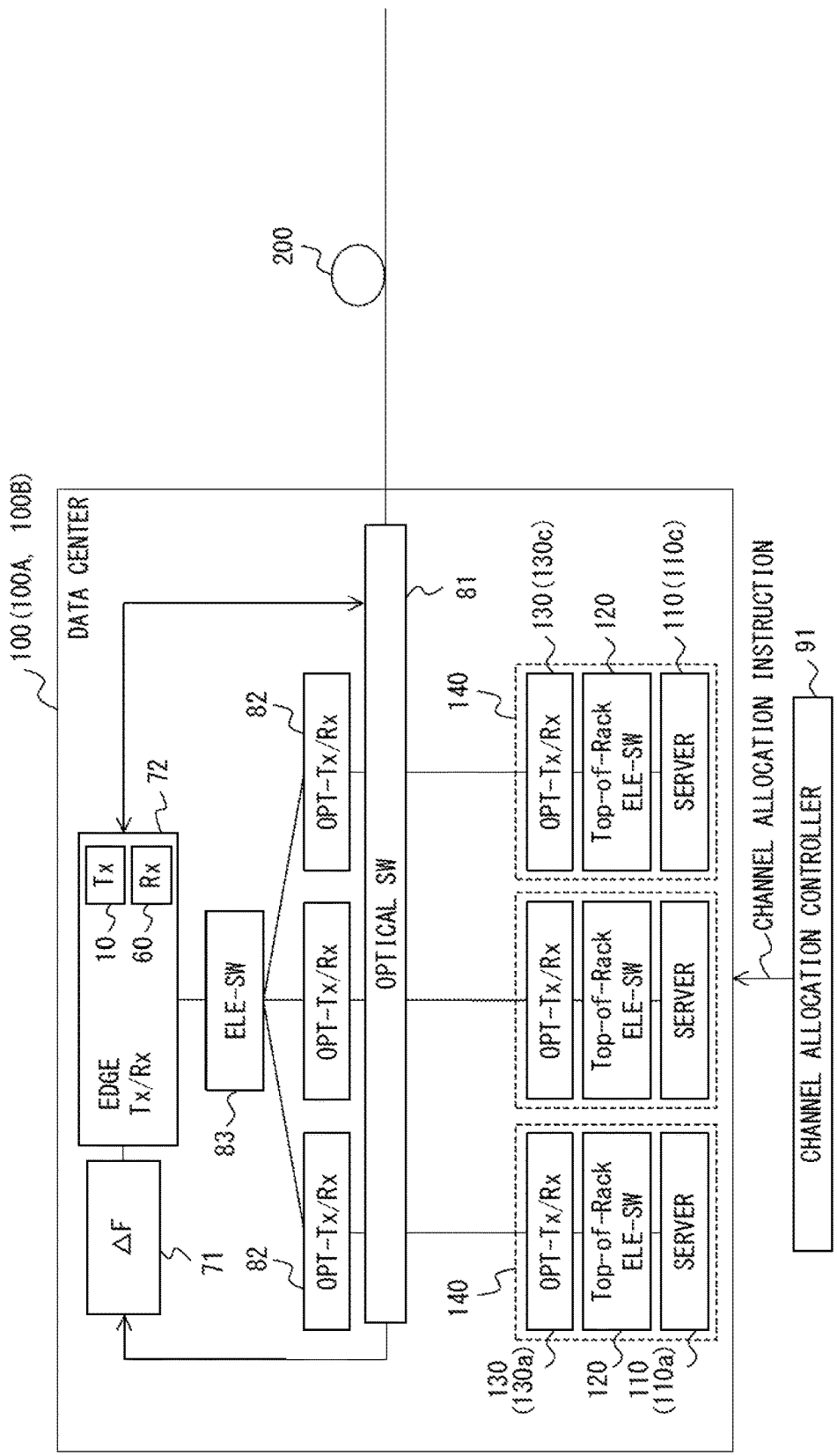
FIG. 10 illustrates an example of the communication between data centers.

FIG. 10 illustrates an example of a communication between data centers. The data center 100 illustrated in FIG. 10 corresponds to the data center 100A or 100B illustrated in FIG. 1. Thus, the data center 100 includes a plurality of server racks 140. The server 110, the top-of-rack electric switch 120, and the optical transceiver 130 are accommodated in each of the server racks 140. In this example, a WDM optical signal is transmitted in a communication performed between data centers.

The data center 100 includes an optical frequency difference detector (ΔF) 71, an edge transceiver 72, an optical switch 81, an optical transceiver 82, and an electric switch 83. The optical frequency difference detector 71 and the edge transceiver 72 correspond to the transceiver circuit 152 illustrated in FIG. 1. The optical switch 81, the optical transceiver 82, and the electric switch 83 correspond to the transceiver circuit 151 illustrated in FIG. 1.

The optical frequency difference detector 71 corresponds to the frequency difference detector 23 in the example of FIG. 5. In other words, the optical frequency difference detector 71 detects a difference between a center frequency of an optical signal transmitted through a general communication path and a center frequency of an optical signal transmitted through an express path. The edge transceiver 72 includes the edge transmitter 10 and the edge receiver 60 illustrated in FIG. 5. The optical frequency difference detector 71 may be implemented within the edge transceiver 72.

A channel allocation controller 91 selects an unused wavelength channel when a request to perform a communication between data centers is made by a user. Then, the channel allocation controller 91 controls the edge transceiver 72, the optical switch 81, the optical transceiver 82, the electric switch 83, and the optical transceiver 130 using a channel allocation instruction, such that the selected wavelength channel is established.

Each optical transceiver 130 can transmit and receive an optical signal by IM/DD. A center frequency of an optical signal transmitted from the optical transceiver 130 is controlled by a channel allocation instruction. The communication within a data center is realized by the optical switch 81. For example, a data transmission from the server 110$a$ to the server 110$c$ is realized by an optical transceiver 130$a$, the optical switch 81, and an optical transceiver 130$c$.

Each optical transceiver 82 can also transmit and receive an optical signal by IM/DD. In other words, the optical transceiver 130 and the optical transceiver 82 can transmit and receive an optical signal through the optical switch 81 by IM/DD.

The communication between data centers is realized by a general communication path or an express path depending on an application. For example, when there is no need for low latency, a general communication path is established in order to save the communication resources between data centers. In this case, a multi-level optical signal is transmitted and received using the edge transceiver 72. For example, when data X accommodated in the server 110$a$ is transmitted to another data center, the data X is guided to the edge transceiver 72 through the optical transceiver 130$a$, the optical switch 81, the optical transceiver 82, and the electric switch 83. Then, the edge transceiver 72 generates a multi-level optical signal X using the edge transmitter 10 (such as the mapper 13, the distortion corrector 14, and the IQ modulator 18 in FIG. 5), and transmits the generated multi-level optical signal X to a specified data center through the optical fiber link 200.

An optical signal received through a general communication path is guided to the edge transceiver 72 by the optical switch 81. Then, the edge transceiver 72 recovers data using the edge receiver 60 (the coherent receiver 61, the FFT processor 63, the separator 64, and the demodulator 65 in FIG. 5). The recovered data is forwarded to a target server through the electric switch 83, the optical transceiver 82, and the optical switch 81.

When there is a need for low latency, an express path is established. In this case, an IM optical signal transmitted from the optical transceiver 130 is guided to the optical fiber link 200 by the optical switch 81. The IM optical signal received through the express path is guided to a target server by the optical switch 81. In other words, the IM optical signal is transmitted between the optical transceivers 130 and 130 without passing through the edge transceiver 72.

When a general communication path and an express path are multiplexed in one wavelength channel, the optical frequency difference detector 71 detects a difference between a center frequency of a multi-level optical signal transmitted through a general communication path and a center frequency of an IM optical signal transmitted through an express path. The edge transmitter 10 modifies an electric field information signal according to the detected frequency difference. Here, the mapping correction illustrated in FIG. 6D is performed in the mapper 13, and the shifting of a center frequency illustrated in FIG. 6C is performed in the frequency controller 15. Then, the edge transmitter 10 generates a multi-level optical signal according to the modified electric field information signal.

Figure 11:
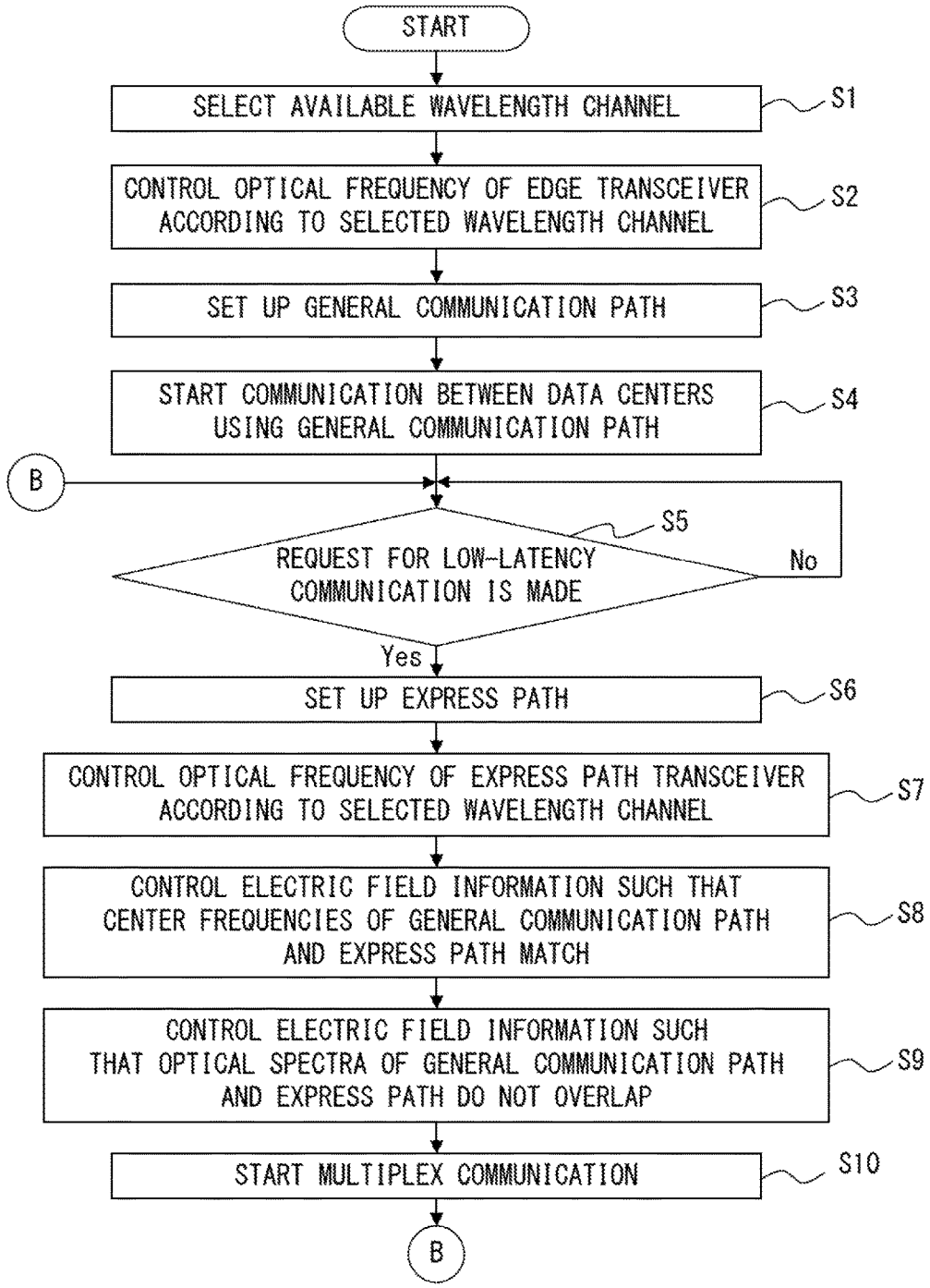
FIGS. 11 and 12 are a flowchart that illustrates an example of the communication between data centers.
Figure 12:
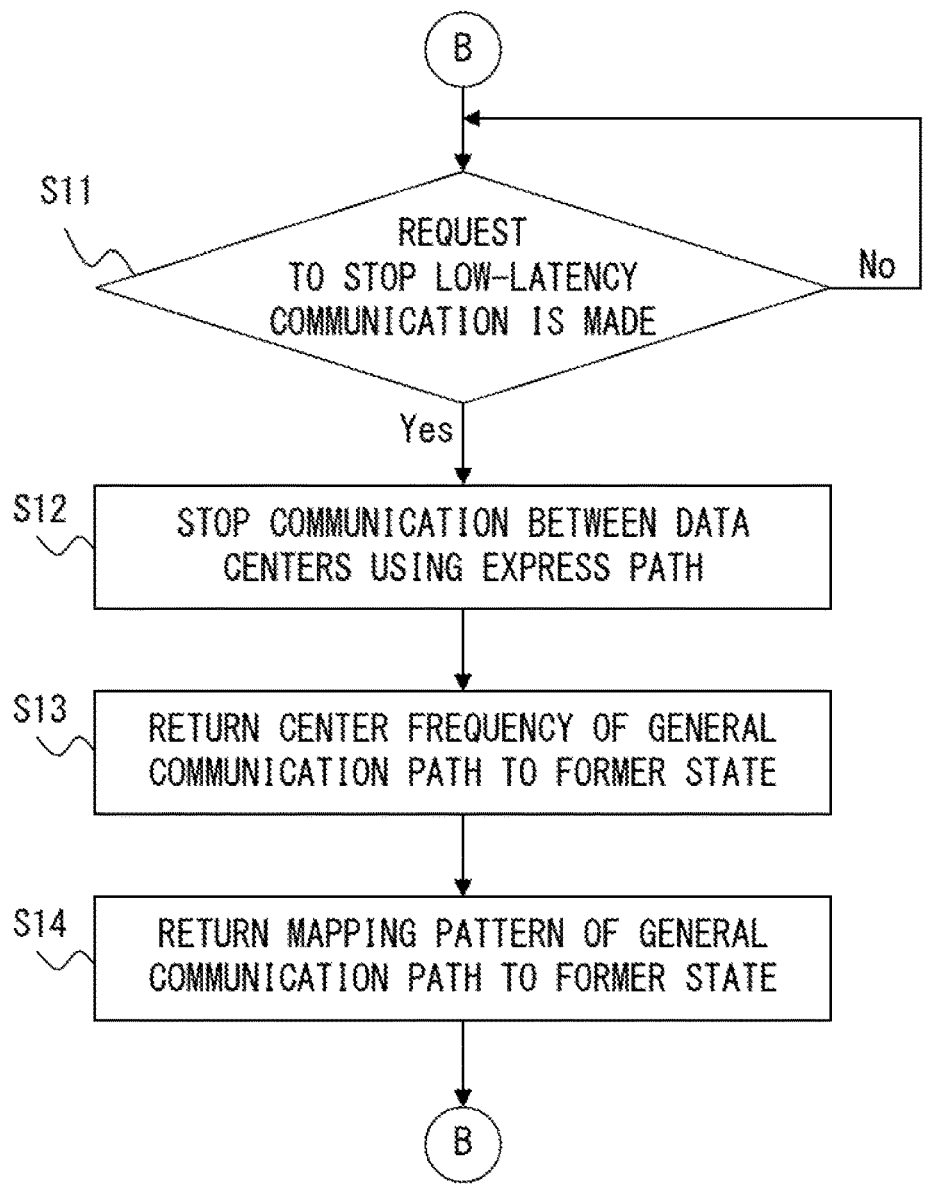

FIGS. 11 and 12 are a flowchart that illustrates an example of a communication between data centers. For example, the processing of this flowchart is performed when a request to perform a communication between data centers is made by a user. In this example, it is assumed that a request to perform a data transmission from a server (a transmission source server) accommodated in a data center to another server (a destination server) accommodated in another data center is made. In the following descriptions, the data center that accommodates a transmission source server may be referred to as a "source data center". Further, the data center that accommodates a destination server may be referred to as a "destination data center".

In S1, the channel allocation controller 91 selects an available wavelength channel in the optical fiber link 200. In the following descriptions, a center frequency of the selected wavelength channel may be referred to as "fz". In S2, the channel allocation controller 91 controls an optical frequency of the edge transceiver 72 according to the selected wavelength channel. In other words, in the source data center, an optical frequency of the light source 17 of the edge transmitter 10 is controlled at fz. In the destination data center, an optical frequency of the local light source used by the coherent receiver 61 of the edge receiver 60 is controlled at fz.

In S3, the channel allocation controller 91 controls the optical switch 81, the optical transceiver 82, and the electric switch 83, and sets up a general communication path. In other words, in the source data center, the optical switch 81, the optical transceiver 82, and the electric switch 83 are controlled such that data read from the transmission source server is guided to the edge transceiver 72. In the destination data center, the optical switch 81, the optical transceiver 82, and the electric switch 83 are controlled such that data recovered from a received optical signal is guided to the destination server. Then, in S4, a communication between data centers using a general communication path is started.

In S5, the channel allocation controller 91 waits for a request to perform a low-latency communication between the data centers to be made. When this request is received, the channel allocation controller 91 controls the optical switch 81 and sets up an express path in S6.

In S7, the channel allocation controller 91 controls an optical frequency of a corresponding optical transceiver 130 according to the wavelength channel selected in S1. In other words, in an optical transceiver 130 corresponding to a transmission source server that performs a low-latency communication, an optical frequency of the light source 131$a$ is controlled at fz. Accordingly, a center frequency of the general communication path established in advance and a center frequency of the newly established express path are both controlled at fz. However, there exists an oscillating frequency error of a laser light source, so the center frequency of the general communication path and the center frequency of the express path do not completely match.

In S8, the optical frequency difference detector 71 detects a difference $\Delta f$ between the center frequency of the general communication path and the center frequency of the express path. The frequency controller 15 of the edge transmitter 10 modifies an electric field information signal according to a result of the detection performed by the optical frequency difference detector 71 such that the center frequency of the general communication path matches the center frequency of the express path. Here, the frequency controller 15 modifies the electric field information signal such that a center frequency of an output optical signal of the IQ modulator 18 is shifted by Δf.

In S9, the mapper 13 of the edge transmitter 10 modifies an electric field information signal of a multi-level optical signal transmitted through the general communication path such that optical spectra of the general communication path and the express path do not overlap. Here, the mapper 13 modifies the electric field information signal such that a spectrum of the multi-level optical signal transmitted through the general communication path is separated into two spectra, for example, as illustrated in FIG. 6D. In other words, the mapper 13 generates the electric field information signal from input data using the mappers 44-1 and 44-2 illustrated in FIG. 8. S8 and S9 may be performed in parallel. Further, S9 is performed before S8. Then, in S10, a communication in which the general communication path and the express path are multiplexed are performed between data centers.

In S11, the channel allocation controller 91 waits for a request to stop the low-latency communication to be made. When this request is received, the data center 100 stops a data transmission using the express path in S12.

In S13, the frequency controller 15 stops modifying an electric field information signal. This results in returning the center frequency of the general communication path to the state before the express path is established. In S14, the mapper 13 returns a mapping pattern for generating an electric field information signal to the state before the express path is established. In other words, the mapper 13 generates an electric field information signal from input data using the mapper 42 illustrated in FIG. 8.

As described above, according to the optical network system of the embodiments of the present invention, a general communication path that transmits a multi-level optical signal and an express path that realizes a low latency are multiplexed. This results in improving the communication resource utilization efficiency in an optical communication that satisfies a plurality of different communication requirements.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
a light source that generates continuous wave light;
a processor that generates a drive signal based on input data;
an optical modulator that modulates the continuous wave light with the drive signal so as to generate a first optical signal;
a combiner that combines the first optical signal and a second optical signal generated by using another light source that is different from the light source; and
a frequency difference detector that detects a frequency difference between a frequency of the continuous wave light and a center frequency of the second optical signal, wherein
the processor generates an electric field information signal based on the input data and modifies the electric field information signal based on the frequency difference such that the frequency of the continuous wave light matches the center frequency of the second optical signal so as to generate the drive signal.

2. The optical transmitter according to claim 1, wherein the processor shifts a center frequency of the first optical signal by controlling a phase indicated by the electric field information signal according to the frequency difference.

3. The optical transmitter according to claim 1, wherein the processor generates the electric field information signal such that an optical spectrum of the first optical signal and an optical spectrum of the second optical signal do not overlap.

4. The optical transmitter according to claim 1, wherein the processor generates a first electric field information signal from bits of a portion of the input data,
the processor generates a second electric field information signal from bits of a another portion of the input data,
the processor modifies the first electric field information signal such that a center frequency of an optical signal generated by the optical modulator according to the first electric field information signal is made higher by a specified amount,
the processor modifies the second electric field information signal such that a center frequency of an optical signal generated by the optical modulator according to the second electric field information signal is made lower by the specified amount, and
the processor combines the modified first electric field information signal and the modified second electric field information signal so as to generate the electric field information signal.

5. The optical transmitter according to claim 1, wherein the first optical signal is generated by a modulation scheme that transmits two or more bits of data for each symbol, and
the second optical signal is generated by intensity modulation or on/off keying.

6. An optical receiver that receives a first optical signal and a second optical signal, wherein center frequencies of the first optical signal and the second optical signal match each other and optical spectra of the first optical signal and the second optical signal do not overlap, the optical receiver comprising:
a coherent receiver that generates an electric field information signal indicating electric field information of input light that includes the first optical signal and the second optical signal;
a frequency separator that extracts, from the electric field information signal, a first electric field information signal that corresponds to the first optical signal and a second electric field information signal that corresponds to the second optical signal;
a processor that calculates an interference component between the first optical signal and the second optical signal according to an intensity of the second optical signal represented by the second electric field information signal and removes the interference component from the first electric field information signal; and a demodulator that demodulates the first electric field information signal from which the interference component is removed.

7. An optical transmission method comprising:

generating an electric field information signal based on input data;

generating a drive signal from the electric field information signal;

modulating continuous wave light with the drive signal so as to generate a first optical signal;

combining the first optical signal and a second optical signal that is generated without using the continuous wave light;

detecting a difference between a frequency of the continuous wave light and a center frequency of the second optical signal; and modifying the electric field information signal based on the detected difference such that the frequency of the continuous wave light matches the center frequency of the second optical signal.

* * * * *